United States Patent [19]

Komine et al.

[11] Patent Number: 4,848,500

[45] Date of Patent: Jul. 18, 1989

[54] HYDRAULIC REACTION CONTROLLING APPARATUS FOR POWER STEERING SYSTEM

[75] Inventors: Ryuichi Komine; Osamu Sano, both of Osaka, Japan

[73] Assignee: Koyo Seiko Co., Ltd., Osaka, Japan

[21] Appl. No.: 195,306

[22] Filed: May 18, 1988

[30] Foreign Application Priority Data

May 19, 1987 [JP] Japan .................................. 62-123384

[51] Int. Cl.⁴ .............................................. B62D 5/06
[52] U.S. Cl. ...................................... 180/142; 180/143
[58] Field of Search ...................... 180/143, 142, 141; 91/434

[56] References Cited

U.S. PATENT DOCUMENTS 4,331,211 5/1982 Lang ................................... 180/141

FOREIGN PATENT DOCUMENTS 52-140129 11/1977 Japan .
55-76764 6/1980 Japan .
61-132466 6/1986 Japan .

Primary Examiner—John A. Pekar
Attorney, Agent, or Firm—Finnegan, Henderson, Farabow, Garrett, & Dunner

[57] ABSTRACT

Apparatus for controlling the steering power of a power steering system of a vehicle wherein there are employed two variable throttles and a fixed throttle between the variable throttles connected to a pump discharge, each variable throttle having an opening controlled in accordance with the vehicle speed or a steering angle and regulated oil pressure between the fixed throttles and one of the variable throttles is led to a hydraulic reaction chamber when the vehicle is running at low or middle speed and regulated oil pressure between the two variable throttles is led to the hydraulic reaction chamber when the vehicle is running at a high speed.

4 Claims, 4 Drawing Sheets

HYDRAULIC REACTION CONTROLLING APPARATUS FOR POWER STEERING SYSTEM

FIELD OF THE INVENTION

The present invention relates to an apparatus for controlling the steering force of a vehicle-mounted power steering system by hydraulic reaction in accordance with a vehicle speed or the like.

BACKGROUND OF THE INVENTION

As disclosed in Japanese Patent Unexamined Publication No. 61-132466, there has been known a reaction controlling apparatus in which a first fixed throttle is disposed in an oil path between an exhaust port of a pump and a power steering valve. A second fixed throttle and a variable throttle with its opening controlled in accordance with vehicle speed, steering angle or the like, are provided in series in another oil path connecting the upstream of the first fixed throttle with a tank or a return path, so that regulated oil pressure in an intermediate portion between the second fixed throttle and the variable throttle is led to a hydraulic reaction chamber.

As disclosed in Japanese Unexamined Patent Publication No. 52-140129, there has been known another reaction controlling apparatus in which two variable throttles connected to a solenoid actuated by a signal from a vehicle speed sensor are disposed in series in an oil branch path that branches off from an oil path between an exhaust port of a pump and a power steering valve and which is connected to a tank so as to lead oil pressure to a hydraulic reaction chamber, whereby regulated oil pressure at an intermediate portion between the two throttles is led to the hydraulic reaction chamber.

Further, as disclosed in Japanese Unexamined Patent Publication No. 55-76764, there has been known a further reaction controlling apparatus in which two variable throttles linked in series by a coupling element actuated manually or by an output quantity of a tachometer are disposed in an oil branch path which is branched off from an oil path between an exhaust port of a pump and a power steering valve and which is connected to a tank so as to lead oil pressure to a hydraulic reaction chamber. With this device, regulated oil pressure at an intermediate portion between the two throttles is led to the hydraulic reaction chamber.

In the hydraulic reaction controlling apparatus disclosed in Japanese Unexamined Patent Publication No. 61-132466, however, there has been a problem in that since the apparatus is arranged such that the reaction oil pressure to be regulated is obtained by the variable and fixed throttles disposed in series, the reaction pressure to be regulated depends on the size of the fixed throttle of a stepping valve during high speed running of a vehicle when the variable throttle is opened. The reaction pressure cannot be sufficiently raised to accommodate the increase of return oil passing there, so that sufficient reaction pressure cannot be obtained.

Further, in the hydraulic reaction controlling apparatus disclosed in Japanese Unexamined Patent Publication No. 55-76764, there has been a problem in that although the apparatus is operated manually or by an output quantity of a tachometer, smooth pressure control cannot be performed since the two throttles change at the same time in the manner of the case described above.

In view of the foregoing problems in the prior art, it is an object of the present invention to provide a hydraulic reaction controlling apparatus that is arranged such that a fixed throttle is provided between two variable throttles disposed in series.

Another object of the present invention is a hydraulic reaction controlling apparatus wherein the return flow is controlled to raise the reaction pressure to a large degree so that sufficient reaction can be obtained during high speed and a smooth pressure characteristic can be obtained during moderate vehicle speed.

A further object of the present invention is a hydraulic reaction controlling apparatus wherein the throttles are arranged on the same shaft so that the apparatus can be made simple in structure.

SUMMARY OF THE INVENTION

To achieve the above and other objects and in accordance with the purpose of the present invention as embodied and broadly described herein the present hydraulic reaction controlling apparatus for a power steering system is provided with means for controlling oil pressure applied to a hydraulic reaction chamber, the means being provided in an oil branch path that is branched off from an oil path between an exhaust port of a pump and a controlling valve for the power steering system and is connected to a tank or a return stream so as to lead oil pressure to the hydraulic reaction chamber. The invention is characterized in that the apparatus comprises two variable throttles and a fixed throttle between the variable throttles, each of the variable throttles having an opening controlled in accordance with a vehicle speed or steering angle, and the fixed and variable throttles being disposed in series on a common shaft. Regulated oil pressure between the fixed throttle and one of the variable throttles disposed at the pump side is led to the hydraulic reaction chamber when a vehicle is running at low or middle speed, and regulated oil pressure between the two variable throttles is led to the hydraulic reaction chamber when the vehicle is running at high speed.

DETAILED DESCRIPTION OF THE INVENTION

Embodiments according to the present invention will be described in detail with reference to the drawings.

Figure 1:
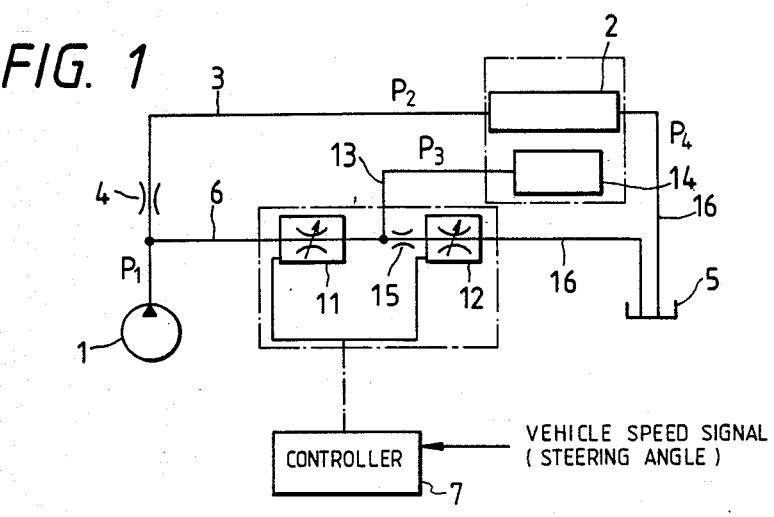
FIG. 1 is a diagram of the oil pressure circuit in an embodiment of the present invention.
Figure 2:
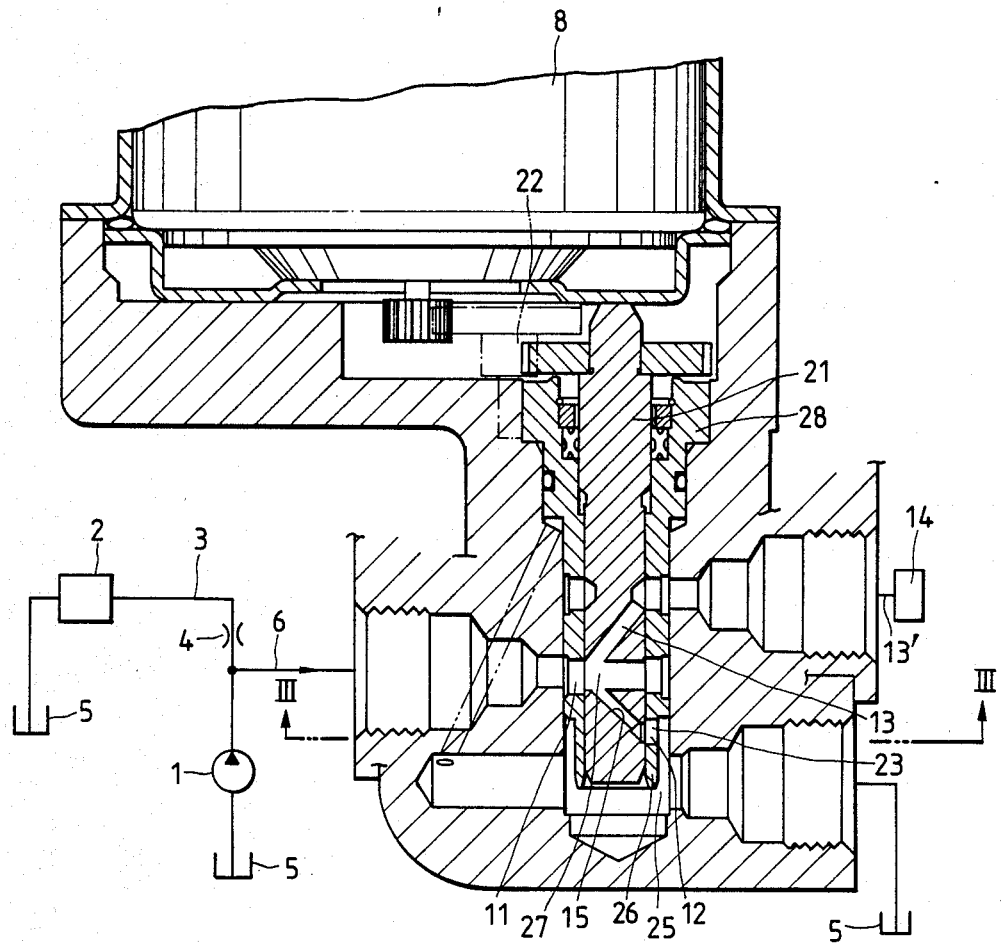
FIG. 2 is a sectional view of a variable throttle in the embodiment of FIG. 1.

Referring to FIGS. 1 and 2, a fixed throttle 4 is disposed in an oil path 3 between an exhaust port of a pump 1 and a controlling valve 2 for power steering. A stepping motor 8, whose rotation is controlled by an output signal of an electronic controller 7 which represents vehicle speed, a steering angle, or the like, is provided in an oil path 6 connecting the upstream of the fixed throttle 4 to a tank 5. The reference numeral 21 represents a rotor shaft of the stepping motor 8 reduced through a reduction gear 22. The rotor shaft 21 is provided with a first variable throttle 11, a second variable throttle 12, and an intervening fixed throttle 15 for the oil path 6. The first variable throttle 11, the second variable throttle 12, and the fixed throttle 15 are disposed in the downstream path of the oil path 6, and oil paths 13 and 13' are branched off from an intermediate portion between the first variable throttle 11 and the fixed throttle 15 and lead to a hydraulic reaction chamber 14. The first variable throttle 11 has a function of controlling the flow from the oil path 6, and the second variable throttle 12 has a function of controlling the return flow to the tank 5 via return stream 16.

Figure 3:
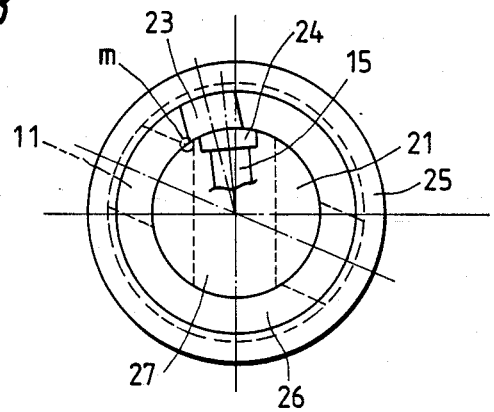
FIG. 3 is a sectional view taken on line III—III of FIG. 2 and showing the state of the throttle upon stopping of a vehicle.
Figure 4:
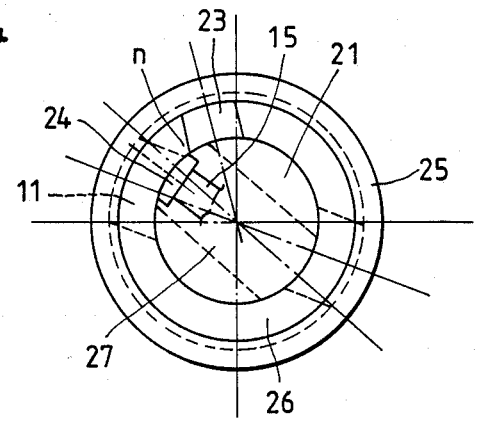
FIG. 4 is a sectional view taken on line III—III of FIG. 2 and showing the state of the throttle at high vehicle speed.

FIG. 3 is a sectional view taken on line III—III of FIG. 2 and showing the state when a vehicle is stopped or moving at a low speed, and FIG. 4 is a sectional view taken on line III—III of FIG. 2 and showing the state when the vehicle is running at a high speed.

Referring to FIGS. 3 and 4, the reference numeral 27 represents a port 27 of the rotor shaft 21 forming the first variable throttle 11. Reference numeral 23 represents a port 23 of the second variable throttle 12 that is formed in an end 26 of a housing 28. Reference numeral 24 represents a port of the rotor shaft 21 forming the second variable throttle 12, and reference numeral 25 represents an annular chamber 25 communicating with the tank 5. The sizes of the respective ports 23 and 24 are preferably made larger than the fixed throttle 15.

Figure 5:
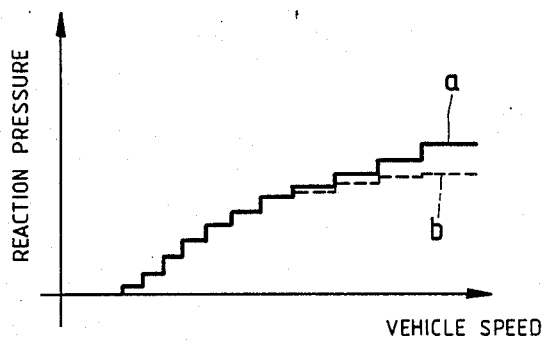
FIG. 5 is a graphical representation of regulated reaction pressure in the embodiment according to the present invention and in a conventional apparatus.

FIG. 5 shows a graph of regulated reaction pressure versus vehicle speed, in which the symbol a identifies a graph of the reaction pressure according to the present invention, and the symbol b represents a reaction pressure in a conventional apparatus such as that disclosed in Japanese Unexamined Patent Publication No. 61-132466. This latter apparatus will hereinafter be referred to as the conventional apparatus in comparison with the embodiment of the present invention.

Figure 6:
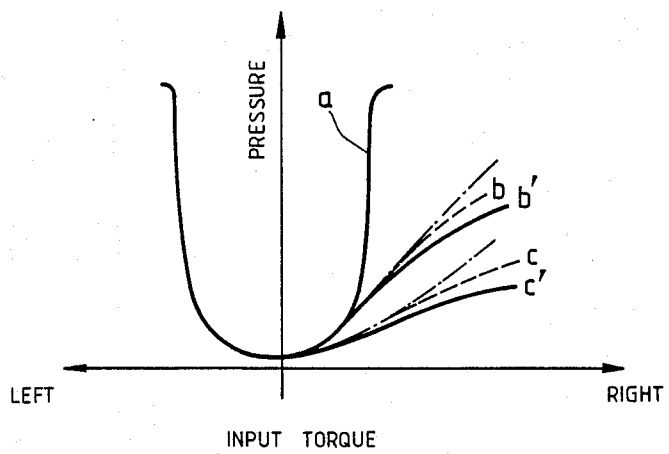
FIG. 6 is a graphical representation of a controlling valve in the embodiment of the present invention and in a conventional apparatus.

FIG. 6 graphically illustrates control valve characteristics of a power steering system, in which the symbol a represents the valve characteristic of the conventional apparatus in the condition of the vehicle being stopped or running at an extremely low speed, b represents the valve characteristic of the conventional apparatus when running at a middle speed, and c represents the valve characteristic of the conventional apparatus when running at a high speed. b' and c' represent valve characteristics of the present invention.

Next, the operation of the oil reaction controlling apparatus for a power steering system of the above-mentioned embodiment will be described. If the pump 1 rotates, oil pressure P1 generated in the oil discharged from the pump 1 is reduced when the oil passes through the fixed throttle 4. The relationship between the oil pressure P1 and oil pressure P2 applied to the controlling valve 2 for power steering is P1>P2.

When the vehicle speed is zero, the stepping motor 8 operates in response to a signal from the electronic controller 7 to close the first variable throttle 11 fully to cut off the oil path 6 so that no oil pressure is exerted on the hydraulic reaction chamber 14. Consequently, the power steering system has the same characteristic as shown by curve a of FIG. 6 for the conventional apparatus, and it is possible to achieve light handle-steering. As shown in FIG. 3, a port of the housing 28 of the first variable throttle 11 and the port 27 of the rotor shaft 21 are closed at a portion m.

When the vehicle is running straight at a middle speed, the vehicle speed increases and the stepping motor 8 operates in response to a signal from the electronic controller 7 to open the first variable throttle 11. At this time, among a degree of opening A of the first variable throttle 11, the above-mentioned oil pressure P1, a degree of opening B of the fixed throttle 15, oil pressure P3 of the oil path 13 and back pressure P4 at the tank 5 side, the following relationship is established:

$$P3 = \frac{A^2 P1 + B^2 P4}{A^2 + B^2}$$

Assuming that the value of P4 is zero since it is atmospheric pressure, the relationship becomes as follows:

$$P3 = \frac{A^2 P1}{A^2 + B^2}$$

When the degrees of opening B and C of the fixed throttles 15 and the second variable throttle 12 are much larger than the degree of opening A of the first variable throttle 11, P3=0 is established. That is, no pressure is generated in the oil path 13, and there is no steering load near the neutral position of a handle so that it is possible to steer by a light force in the same manner as when the vehicle speed is zero.

When handle-steering is performed in running at a middle speed, power-assist of the power steering system is started so that the oil pressure P1 is increased gradually. Consequently, the increase of P1 in the above equations arises beyond the rate of contribution of the respective degree of opening B and C of the fixed throttle 15 and the second variable throttle 12 so that the oil pressure P3 of the oil path 13 increases. The oil pressure P3 increases in proportion of the increase of the oil pressure P1. Consequently, the oil pressure P3, proportional to the oil pressure P1, is exerted on the hydraulic reaction chamber 14, and the reaction of the oil pressure in steering is increased to obtain a characteristic having the sense of resistance as shown in b' of FIG. 6.

When the car is running at a high speed, the rotor shaft 21 is further rotated left as shown in FIG. 4 so that the degree of opening A of the ports 11 and 27 of the first variable throttle 11 is made sufficiently large, and at the same time, the degree of opening C of the ports 23 and 24 of the second variable throttle 12 formed in the same shaft as the first variable throttle 11 becomes smaller than the degree of opening B of the fixed throttle 15. If the vehicle speed is increased more, the ports 23 and 24 are fully closed. Consequently, the oil pressure flowing through the branched oil path 6 in FIG. 1 is prevented from flowing into the return stream path 16 to the tank 5 so that the whole flow from the pump 1 flows through the oil path 3 to the controlling valve 2 for power steering, and flows through the first variable throttle 11 opening in the state where there is the maximum loss of pressure through the fixed throttle 4, that is, in the state of P1−P2=MAX. Then P3MAX is exerted on the oil reaction chamber 14 so that such a characteristic a as shown in FIG. 5 is exhibited, and as the reaction pressure increases, the steering force is made heavier as shown by C' of FIG. 6 when compared to the conventional reaction characteristic C.

Figure 7:
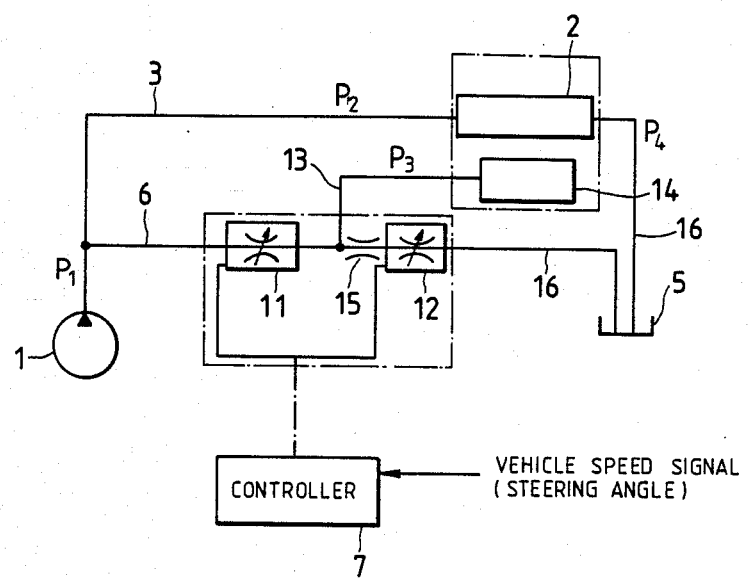
FIG. 7 is a diagram showing the oil pressure circuit of another embodiment of the present invention.

FIG. 7 shows a second embodiment having an arrangement in which a controlling valve 2 capable of exhibiting a throttle effect by itself is provided in place of the fixed throttle 4 in FIGS. 1 and 2. In this embodiment, it is possible to prevent the disadvantage due to fluid pressure drop generated when the fixed throttle 4 is made sufficiently small in the first-mentioned embodiment.

Figure 8:
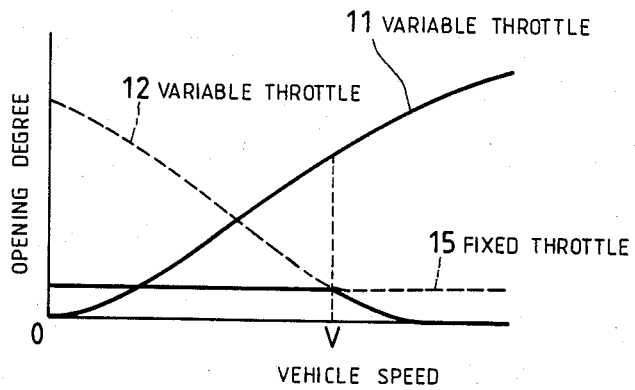
FIG. 8 is a graph showing opening degrees of two variable throttles and a fixed throttle according to the present invention in comparison to vehicle speed.

FIG. 8 shows the relative relationship among the two variable throttles 11 and 12 and the fixed throttle 15 with respect to the relationship between vehicle speed and an opening degree. When the vehicle speed is in the range of from 0 to V, reaction pressure depends on the respective degrees of opening (A and B) of the first variable throttle 11 and the fixed throttle 15, and when the vehicle speed becomes higher than V, reaction pressure depends on the respective degrees of opening (B and C) of the first variable throttle 11 and the second variable throttle 12.

As described above, according to the present invention, the smooth characteristic of reaction can be obtained when a vehicle is running at a middle speed, and the characteristic of
steering which has a high stiffness at a neutral position of the handle and which has the sense of resistance at the time of handle-operation can be obtained.

Having described preferred embodiments of the present invention it is to be understood that variations and modifications thereof which fall within the spirit and scope of the present invention will become apparent to those skilled in the art, and it is intended that the scope of the invention be limited only by the appended claims and their equivalents.

What is claimed is:

1. In a hydraulic reaction controlling apparatus for a power steering system provided with means for controlling oil pressure applied to a hydraulic reaction chamber, the controlling means being provided in an oil branch path that is branched off from an oil path between an exhaust port of a pump and a controlling valve for the power steering system and connected to a tank or a return stream so as to lead oil pressure to the hydraulic reaction chamber, the improvement comprising two variable throttles and a fixed throttle between said variable throttles positioned in said oil branch path, each of said variable throttles having an opening controlled in accordance with a signal representing vehicle speed so that the degree of opening of the first of said variable throttles is increased as the vehicle speed increases to provide a path of regulated oil pressure between said pump exhaust port and said fixed throttle, said first variable throttle and said hydraulic reaction chamber, and the degree of opening of the second of said variable throttles is decreased as the vehicle speed increases to establish a path of regulated oil pressure between said pump exhaust port, said two variable throttles and said hydraulic reaction chamber.

2. A hydraulic reaction controlling apparatus for a power steering system according to claim 1, wherein the degree of opening of each of said variable throttles is controlled by a stepping motor which operates in response to said signal representing vehicle speed.

3. In a hydraulic reaction controlling apparatus for a power steering system provided with means for controlling oil pressure applied to a hydraulic reaction chamber, the controlling means being provided in an oil branch path that is branched off from an oil path between an exhaust port of a pump and a controlling valve for the power steering system and connected to a tank or a return stream to lead oil pressure to the hydralic reaction chamber, the improvement comprising two variable throttles and a fixed throttle between said variable throttles positioned in said oil branch path, each of said variable throttles having an opening controlled in accordance with a signal representing vehicle speed, said fixed and variable throttles being connected in series in one and the same path, so that the degree of opening of the first of said variable throttles is increased as the vehicle speed increases to provide a path of regulated oil pressure between said pump exhaust port and said fixed throttle, said first variable throttle and said hydraulic reaction chamber, and the degree of opening of the second of said variable throttles is decreased as the vehicle speed increases to establish a path of regulated oil pressure between said pump exhaust port, said two variable throttles and said hydraulic reaction chamber.

4. A hydraulic reaction controlling apparatus for a power steering system according to claim 3, wherein the degree of opening of each of said variable throttles is controlled by a stepping motor which operates in response to said signal representing vehicle speed.

* * * * *